(12) United States Patent
Nakanishi et al.

(10) Patent No.: US 7,556,439 B2
(45) Date of Patent: Jul. 7, 2009

(54) BIDIRECTIONAL OPTICAL ASSEMBLY AND METHOD FOR MANUFACTURING THE SAME

(75) Inventors: Hiromi Nakanishi, Kanagawa (JP); Masaki Furumai, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 627 days.

(21) Appl. No.: 11/395,164

(22) Filed: Apr. 3, 2006

(65) Prior Publication Data

US 2007/0122154 A1 May 31, 2007

(30) Foreign Application Priority Data

Apr. 4, 2005 (JP) ............................. 2005-107661

(51) Int. Cl.
*G02B 6/36* (2006.01)
*H04J 14/02* (2006.01)

(52) U.S. Cl. .............................. 385/92; 385/88; 385/24; 398/85; 398/82; 398/79

(58) Field of Classification Search .................... 385/14, 385/53, 88, 89, 92, 93, 94, 24; 398/41, 42, 398/43, 67, 68, 79, 82, 85
See application file for complete search history.

(56) References Cited

U.S. PATENT DOCUMENTS

| | | | |
|---|---|---|---|
| 5,408,559 A * | 4/1995 | Takahashi et al. | 385/89 |
| 6,142,680 A * | 11/2000 | Kikuchi et al. | 385/93 |
| 6,493,121 B1 | 12/2002 | Althaus | 359/152 |
| 7,369,776 B2 * | 5/2008 | Masahiko | 398/138 |
| 2005/0180755 A1* | 8/2005 | Masahiko | 398/135 |
| 2006/0083514 A1* | 4/2006 | Liu et al. | 398/85 |
| 2007/0122154 A1* | 5/2007 | Nakanishi et al. | 398/85 |

FOREIGN PATENT DOCUMENTS

JP 2003-524789 A 8/2003 ............. 359/152 X

* cited by examiner

*Primary Examiner*—Brian M Healy
(74) *Attorney, Agent, or Firm*—Venable LLP; Michael A. Sartori; Steven J. Schwarz

(57) ABSTRACT

The present invention provides a bi-direction optical assembly with two optical transmitting channels by a small-sized package and relatively low cost. In the bi-directional optical assembly, the first transmitting optical subassembly (TOSA) and the receiving optical subassembly (ROSA) are optically coupled with the optical fiber via the inner housing. While the second transmitting optical subassembly is optically coupled with the optical fiber via the outer housing slidable to the inner housing.

17 Claims, 5 Drawing Sheets

BIDIRECTIONAL OPTICAL ASSEMBLY AND METHOD FOR MANUFACTURING THE SAME

BACKGROUND OF THE INVENTION

1. Field of the Invention

The present invention relates to a bidirectional optical assembly, in particular, the invention relates to a bidirectional optical assembly having two ports for an optical transmitter.

2. Related Prior Art

A bidirectional optical assembly comprises an optical transmitting subassembly (hereinafter referred by TOSA) for a transmitting channel, an optical receiving subassembly (hereinafter referred by ROSA) for a receiving channel, an optical fiber and a housing. The housing forms a tubular shape, one end of which secures the TOSA that is arranged along an axis of the tube, while, the other end thereof secures the optical fiber to optically couple with the TOSA in precise. On the other hand, the ROSA is supported in the side of the tubular housing and coupled with the optical fiber via an optical filter. Refer to Japanese patent application published as JP-2003-524789A.

It is known that one type of the bidirectional optical assembly with two channels for the transmission includes two TOSAs and one ROSA independent to each other. In this assembly, each of the optical transmitting subassembly and the optical receiving subassembly couple with the respective optical fibers, and respective optical fibers are attached with an optical filter to transmit signal light with preset wavelengths. Moreover, the optical fibers are coupled with the optical coupler. This type of the optical assembly is hard to miniaturize and is relatively cost un-effective because the assembly requires a number of optical element, for instance, the optical filter and the optical coupler.

The present invention is to provide a bidirectional optical assembly having two transmitting channels with a miniaturized shape and a low-cost.

SUMMARY OF THE INVENTION

One aspect of the present invention relates to an arrangement of a bi-directional optical subassembly. The bi-direction optical subassembly of the present invention comprises first and second transmitting optical subassemblies (TOSA), a receiving optical subassembly (ROSA), a sleeve assembly including an optical fiber that carries both transmitting and receiving optical signals, first and second wavelength division multiplex (WDM) filters, and a housing configured to install these filters and to secure two TOSAs, the ROSA, and the sleeve assembly. The first TOSA emits light with the first wavelength, the second TOSA emits light with the second wavelength, and the ROSA receives light with the third wavelength. These first to third wavelengths are different from each other. The first WDM filter, arranged between the first TOSA and the sleeve assembly, reflects the light with the first wavelength and transmits the light with the second wavelength. The second WDM filter, arranged between the sleeve assembly and the ROSA, transmits the light with first and second wavelengths and reflects the light with the third wavelength. Moreover, the housing includes an inner housing configured to secure the first TOSA, the ROSA and the sleeve assembly and an outer housing configured to receive the inner housing and to secure the second TOSA.

The first TOSA and the ROSA are fixed to the inner housing as aligning along the optical axes thereof. On the other hand, the sleeve assembly is fixed as aligning the position thereof along two directions perpendicular to the optical axis. Moreover, the second TOSA is fixed to the outer housing as aligning the position thereof along the optical axis, while, the outer housing is fixed to the inner housing as aligning the position thereof along two directions perpendicular to the optical axis. Therefore, since the first and second TOSAs, and the ROSA may be independently aligned along three directions against the optical axis of the sleeve assembly, the fine optical coupling for respective assemblies may be independently obtained.

The first TOSA and the ROSA are preferable to provide wavelength selective filters to selectively transmit light with first and third wavelengths, respectively, which enables to reduce the optical noise.

Further, it is preferable to provide an isolator between the first and second WDM filters to transmit light propagating from the first WDM filter to the second WDM filter and to cut light propagating from the second WDM filter to the first WDM filter, which prevent light emitted from the optical fiber from returning the first and second TOSAs to become a noise source for the light-emitting devices installed within the first and second TOSAs.

The inner housing preferably provides a flange in an end surface thereof. The sleeve assembly may slide on an outer surface of this flange along two directions perpendicular to the optical axis. While, by sliding an end surface of the outer housing on an inner surface of this flange, the outer housing may slide along two directions perpendicular to the optical axis. Thus, the first and second TOSAs may be independently aligned in their position.

Another aspect of the present invention relates to a method for manufacturing the bi-directional optical assembly. In the present method, first of all, the first TOSA permanently fixes in the position thereof by the YAG laser welding after aligning with the sleeve assembly via the inner housing. The first TOSA optically aligns with the inner housing along the direction parallel to the optical axis, while, the sleeve assembly optically aligns with the inner housing along directions perpendicular to the optical axis. Next, the second TOSA optically aligns with the outer housing along the direction parallel to the optical axis, while, the outer housing optically aligns with the inner housing along directions perpendicular to the optical axis. Thus, the first and second TOSAs may be aligned independently and separately along three directions against the optical axis, which attains a superior optical coupling efficiency.

The alignment between the ROSA and the sleeve assembly may be carried out after the optical alignment between the first TOSA and the sleeve assembly, or may be preformed after the optical alignment between the second TOSA and the sleeve assembly.

Moreover, by securing the ROSA to the inner housing through the second alignment member, the ROSA may be aligned not only in two directions perpendicular to the optical axis but also in the direction parallel to the optical axis. Accordingly, the superior optical coupling efficiency may be attained for the ROSA.

DESCRIPTION OF PREFERRED EMBODIMENTS

Figure 1:
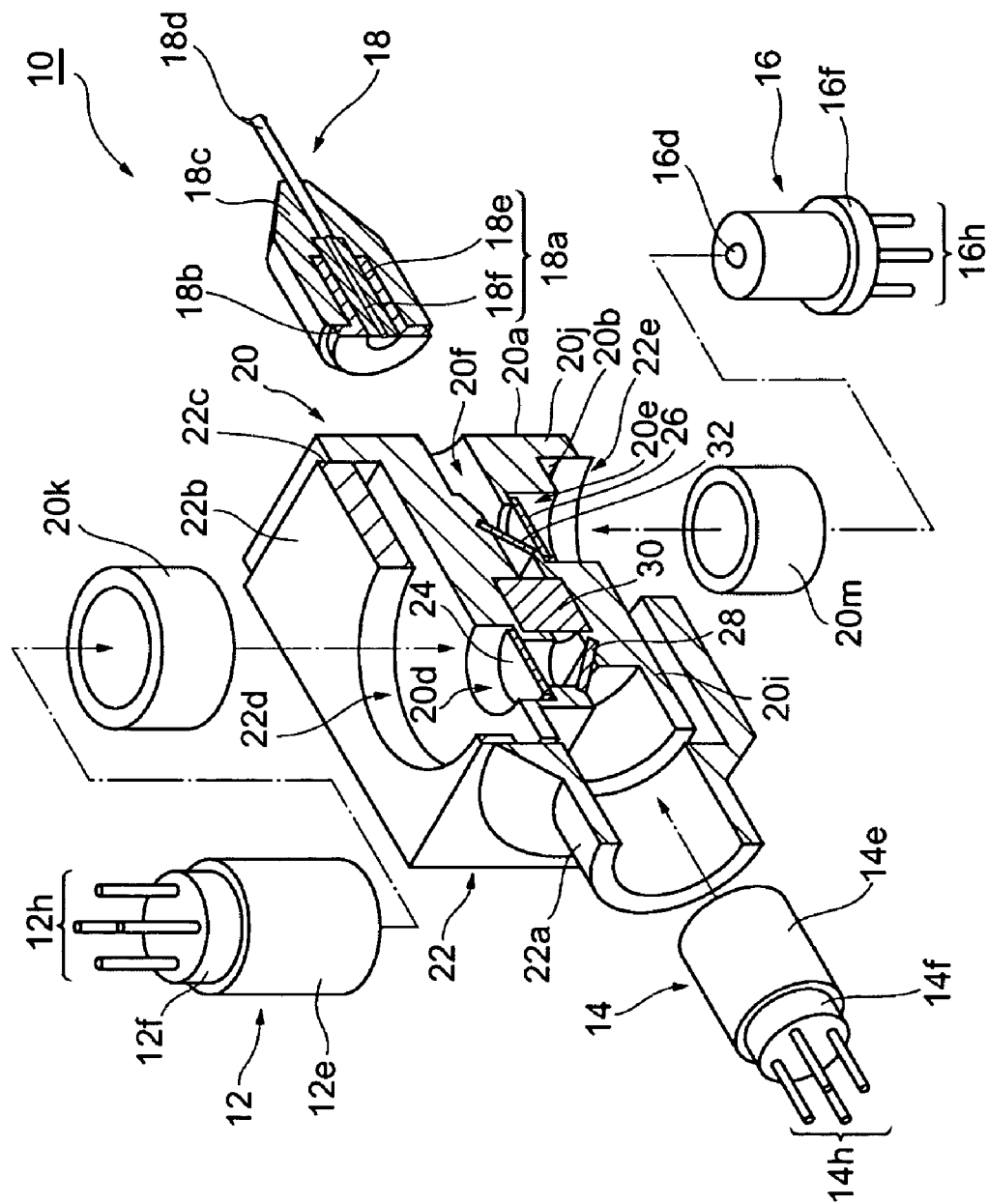
FIG. 1 is an exploded perspective view showing the bidirectional optical assembly according to the first embodiment of the invention.

Next, preferred embodiments of the present invention will be described as referring to accompanying drawings. In the drawings, same numerals and symbols will refer to the same elements or the elements equivalent to each other.

First Embodiment

Figure 2:
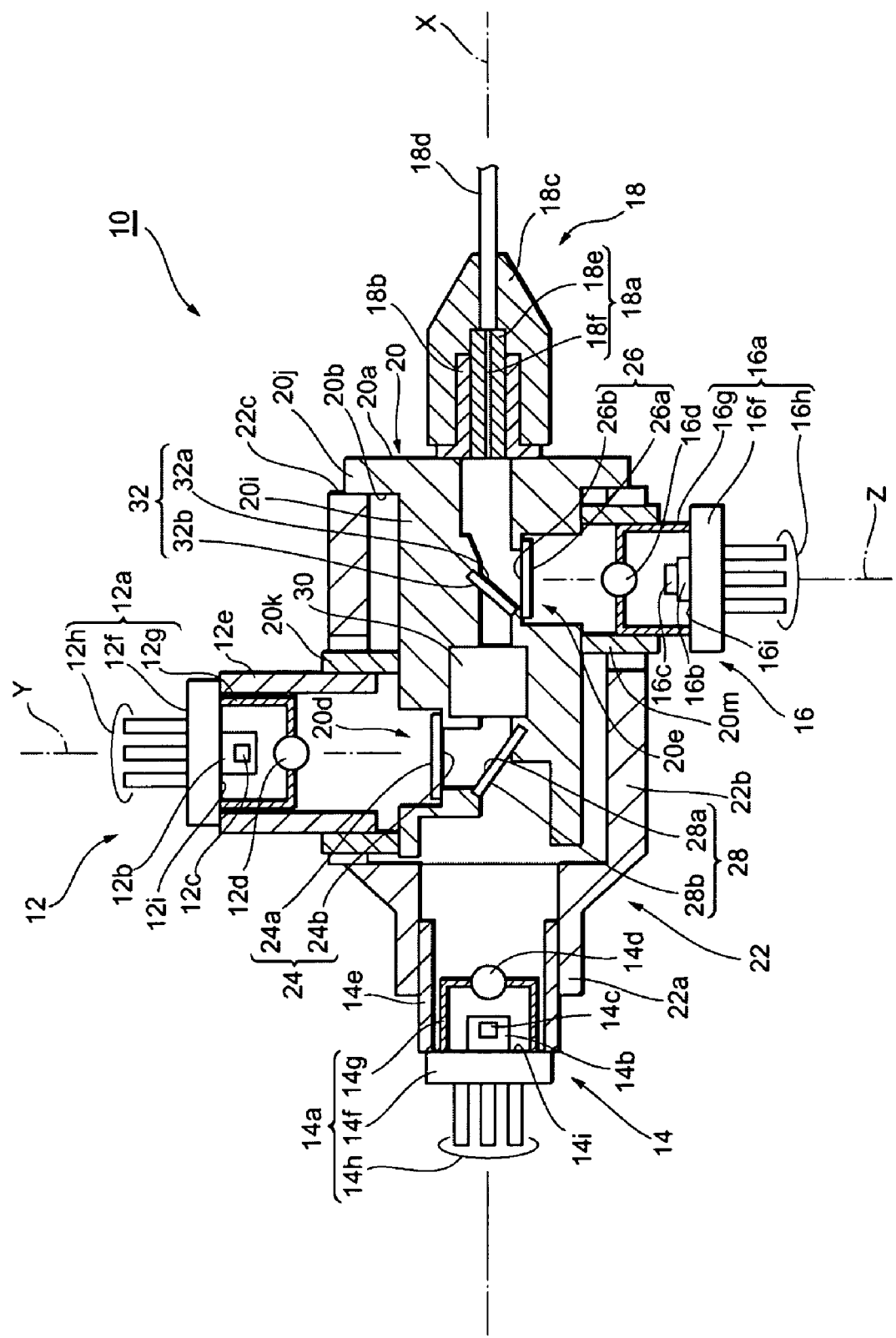
FIG. 2 is a cross sectional view of the bidirectional optical assembly according to the first embodiment of the invention.

FIG. 1 is an exploded perspective view showing a bidirectional optical assembly according to the first embodiment of the present invention, which is partially broken. FIG. 2 is a cross sectional view of the bidirectional optical assembly according to the first embodiment. The bidirectional optical assembly 10 shown in FIGS. 1 and 2 comprises a first transmitting optical subassembly (TOSA) 12, a second TOSA 14, a receiving optical subassembly (ROSA) 16, a sleeve assembly 18, an inner housing 20 and an outer housing 22.

The first TOSA 12 comprises a package 12a, a sub-mount 12b, a light-emitting device 12c, a condenser lens 12d, and a sleeve 12e. The package 12a includes a stem 12f, a lens cap 12g, and a lead terminal 12h. The stem 12f provides a mounting surface 12i. A plurality of lead terminals 12h extend from the stem 12g to a direction substantially perpendicular to the stem 12f. On the mounting surface 12i is installed with the sub-mount 12b, and on the sub-mount 12b is mounted with the light-emitting device 12c. The light-emitting device 12c emits light with the first wavelength. The light-emitting device may be a laser diode for emitting light with the wavelength of 1350 nm as a center wavelength.

On the mounting surface 12i is secured with the lens cap 12g. The lens cap 12g is a tubular member to form, co-operated with the stem 12f, a cavity where the sub-mount 12b and the light-emitting device 12c is installed therein. This cavity is air-tightly sealed from the outside. The lens cap 12g holds the lens 12d in one end, the ceiling thereof. The condenser lens 12d, receiving the light emitted from the light-emitting device 12c by one surface thereof, outputs the light from the other surface thereof as focusing it. The lens cap 12g provides the sleeve 12e with a tubular shape in the periphery thereof. One end of the sleeve 12e is supported by the mounting surface 12i. The sleeve 12e may be made of material able to be welded by the YAG laser, for instance, made of stainless steel.

The second TOSA 14, similar to the configuration of the first TOSA 12, includes the package 14a, the sub-mount 14b, the light-emitting device 14c, the condenser lens 14d, and the sleeve 14e. The package 14a includes the stem 14f, the lens cap 14g, and a plurality of lead terminals 14h. The configuration of the second TOSA 14 is the same with those of the first TOSA 12 except that the light-emitting device 14c of the second TOSA 14 emits light with the second wavelength different from the first wavelength, for example, a center wavelength thereof being around 1570 nm.

The ROSA 16 receives the light with the third wavelength, for example, a center wavelength of 1510 nm, from the optical fiber 18f that will be described later. The ROSA 16 includes the package 16a, the chip carrier 16b, the light-receiving device 16c, and the condenser lens 16d. The package 16a includes the stem 16f, the lens cap 16g, and a plurality of lead terminals 16h. The stem 16f provides the mounting surface 16i. The lead terminals 16h protrude from the stem 16f along a direction nearly perpendicular to the mounting surface 16i. On the mounting surface 16i is installed with the light-receiving device 16c via the chip carrier 16b. The light-receiving device 16c may be a photodiode.

The mounting surface 16i mounts the lens cap 16g thereon. This lens cap 16g, cooperating with the stem 16f, forms a cavity where the light-receiving device 16c and the sub-mount 16b are enclosed therein. The cavity is hermetically sealed from the outside. The lens cap 16g is made of material able to be welded by the YAG laser, for instance, made of kovar. The end of the lens cap 16g, namely, the ceiling thereof holds the condenser lens 16d, which receives the light with the third wavelength in one surface thereof and focuses this light on the light-receiving device 16c.

The sleeve assembly 18 includes the stub 18a, the bush 18b, the cover 18c, and the optical fiber 18d. The stub 18a includes the ferrule 18e and the coupling fiber 18f.

The ferrule 18e secures the coupling fiber 18f in a center thereof. The bush 18b secures the stub 18b within the bore thereof. This bush 18b forms a flange in the end portion thereof, and this flange constitutes the end of the sleeve assembly 18. The bush 18b is made of material able to be welded by the YAG laser, for instance, made of stainless steel, and is welded by the flange. A portion of the bush 18b and a portion of the optical fiber 18d continuous to the stub 18f are protected by the cover 18c.

The inner housing 20 extends along the axis X. The inner housing 20 is made of material able to be welded by the YAG laser, for instance, made of stainless steel. The inner housing 20 includes a first surface 20a, which becomes one end surface thereof, and a second surface 20b opposite to the first surface. In the present embodiment, the inner housing 20 provides a body portion 20i and a flange 20j in this order along the axis X. The cross section of the flange 20j is greater than the cross section of the body portion 20i. The end surface of the flange 20j forms the first surface 20a, while a surface opposite to the first surface 20a becomes the second surface 20b.

In the body portion 20i of the inner housing 20 is formed with an opening 20d along a direction Y intersecting the axis X. Moreover, the body portion 20i forms another opening 20e along the direction Z also intersecting the axis X. The opening 20d includes a couple of openings, each having larger and smaller bores, sequentially formed heading to an inner bore 20f of the inner housing 20. In a step between these larger and smaller bores is attached with the wavelength selective filter 24. One surface 24a of the wavelength selective filter 24, which faces the first TOSA 12, optically couples with the condenser lens 12d within the first TOSA 12, while, the other surface 24b of the wavelength selective filter 24 optically couples with one surface 28a of the wavelength division multiplex (WDM) filter that will be described later. This wavelength selective filter 24 transmits the light with the first wavelength, while, it reflects the light with other wavelengths. Therefore, this wavelength selective filter 24 prevents the light with the second wavelength emitted from the second TOSA 14 from entering the first TOSA 12.

The opening 20e, similar to the opening 20d, includes a couple of bores sequentially formed in this order along a direction for the inner bore 20f of the inner housing 20, each having a larger diameter and a smaller diameter. In the step between two bores is installed with the wavelength selective filter 26. One surface 26b of the wavelength selective filter 26 optically couples with the condenser lens 16d, while, the other surface 26b of the filter optically couples with one surface 32a of the second WDM filter to be described later. The wavelength selective filter 26 transmits the light with the third wavelength, while, it reflects light with other wavelengths. Therefore, the filter prevents the light with wavelengths other than the third wavelength emitted from the coupling fiber 18f from entering the ROSA 16.

Within the inner bore 20f of the inner housing 20 is installed with the first WDM filter 28, the optical isolator 30, and the second WDM filter 32 in this order along the axis X. The first WDM filter 28 is placed on a surface intersecting both axes, X and Y. One surface 28a of the first WDM filter 28 optically couples with the other surface 24b of the first wavelength selective filter 24, while, the other surface 28b thereof optically couples with the condenser lens 14d within the second TOSA 14. The first WDM filter 28 reflects the light with the first wavelength that is incident from the first TOSA 12 transmitting through the first bore 20d to the direction along the axis X, while, it transmits the light with the second wavelength that is incident from the second TOSA 2 to the side of the sleeve assembly 18.

The isolator 30 is an optical device to permit light to transmit along only one direction. This isolator 30 prevents light from transmitting from the side of the sleeve assembly 18f to the second TOSA 14. Therefore, the isolator may prevent the light with the third wavelength from the coupling fiber 18f from entering the first and second TOSAs, 12 and 14.

The second WDM filter 32 is arranged on a plane intersecting both axes, X and Z. One surface 32a of the second WDM filter 32 optically couples with the end of the coupling fiber 18f and the other surface 26b of the wavelength selective filter 26. The other surface of the second WDM filter 32 optically couples with the surface 28a of the first WDM filter 28 through the isolator 30. This second WDM filter 32 transmits the light with the first wavelength emitted from the first TOSA 12 and the light with the second wavelength emitted from the second TOSA 14 to the end of the coupling fiber 18f, while, it reflects the light with the third wavelength emitted from the end of the coupling fiber 18f to the condenser lens 16d.

The inner housing 20 includes first and second alignment members, 20k and 20m, respectively. The first alignment member 20k, having a tubular shape, secures the first TOSA 12 and has an inner diameter nearly equal to an outer diameter of the sleeve 12e of the first TOSA 12. This first alignment member 20k is installed within the inner housing 20 so as to align the axis thereof along the axis Y and welded by the YAG laser to the side of the body portion 20i. The bore of the first alignment member 20k continues to the opening 20d.

The second alignment member 20m, also having a tubular shape, secures the ROSA 16. The inner diameter of the second alignment member 20m is nearly equal to an outer diameter of the lens cap 16g of the ROSA 16. This second alignment member 20m is installed within the inner housing 20 so as to align the center thereof along the axis Z and welded by the YAG laser to the side of the body portion 20i. The bore of the second alignment member 20m continues to the opening 20e.

The outer housing 22, extending along the axis X, includes a support portion 22a and a cap portion 20b along the axis X in this order. The support portion 22a, having a tubular shape, supports the second TOSA 14. The inner diameter of the support portion 22a is nearly equal to an outer diameter of the sleeve 14e. The cap portion 22b receives the body portion 20i of the inner housing 20. The cross section of the cap portion 22b along directions intersecting the axis X is greater than the cross section of the body portion 20i. This cap portion 22b provides, in the end portion thereof, a third surface 22c facing the second surface 20b of the inner housing 20. The cap portion 22b includes an opening 22d along the axis Y, through which the first alignment member 20k passes. The inner diameter of the opening 22d is greater than the outer diameter of the first alignment member 22k. Moreover, the cap portion 22b forms another opening 22e along the axis Z, thorough which the second alignment member 20m passes. The diameter of this opening 22e is greater than the outer diameter of the second alignment member 20m.

Next, a method for assembling the bi-direction optical assembly 10 will be described. First, the cap portion 22b of the outer housing 22 receives the body portion 20i of the inner housing 20. Next, the first alignment member 20k is inserted into the opening 22d along the axis Y, while, the second alignment member 20m is inserted into the opening 22e along the axis Z. Subsequently, the first alignment member 20k and the second alignment member 20m are welded to the side of the body portion 20i by the YAG laser.

Next, the first TOSA 12 is installed within the first alignment member 20k, and the first TOSA 12, in particular, the sleeve 12e thereof, is slid along the axis Y within the first alignment member 20k to align the condenser lens 18d with the light-emitting device 12c within the first TOSA 12, and condenser lens 12d is optically aligned with the coupling fiber 18f by sliding the bush 18b on the first surface 20a of the inner housing 20. Thus, the light-emitting device 12c may optically couple with the coupling fiber 18f. Subsequently, the sleeve 12e is welded to the first alignment member 20k, while, the bush 18b is welded to the inner housing 20 by the YAG laser.

Next, inserting the ROSA 16 into the second alignment member 20m, the lens cap 16g of the ROSA is welded to the second alignment member 20m by the YAG laser. Thus, the condenser lens 16d may be optically couple with the end of the coupling fiber 18f.

Next, inserting the second TOSA 14 into the support portion 22a of the outer housing 22. The condenser lens 14d may be aligned with the coupling fiber 18f by sliding the second TOSA 14 along the axis X and by sliding the third surface 22c of the outer housing 22 on the second surface 20b of the inner housing 20. This alignment process does not disarrange the optical coupling between the coupling fiber 18f and the first TOSA 12, or between the coupling fiber 18f and the ROSA 16. Then, the sleeve 14e of the second TOSA 14 is welded to the support portion 22a, and the outer housing 22 is also welded to the inner housing 20.

According to the bi-directional optical assembly 10 of the present invention, the light-emitting device 12c may optically align with the coupling fiber 18f by sliding the first TOSA 12 along the axis X and the sleeve assembly 18 along two directions each intersecting the axis X. Accordingly, the end of the coupling fiber 18f may be precisely positioned on a focal point of the condenser lens 12d.

Moreover, the second light-emitting device 14c may optically align with the end of the coupling fiber 18f by sliding the second TOSA 14 along the axis X and by sliding the outer housing 22 on the inner housing 20. Accordingly, the end of the coupling fiber 18f may be precisely positioned on a focal point of the condenser lens 14d.

In the bi-directional optical assembly 10, the housing comprising two bodies of the inner and outer housings, 20 and 22, respectively, assembles the first and second TOSAs, 12 and 14, respectively, and the ROSA 16. Moreover, the bi-directional optical assembly may optically couple the first and second TOSAs, 12 and 14, and the ROSA 16 with the single coupling fiber 18f without providing a costly optical coupler.

Second Embodiment

Figure 3:
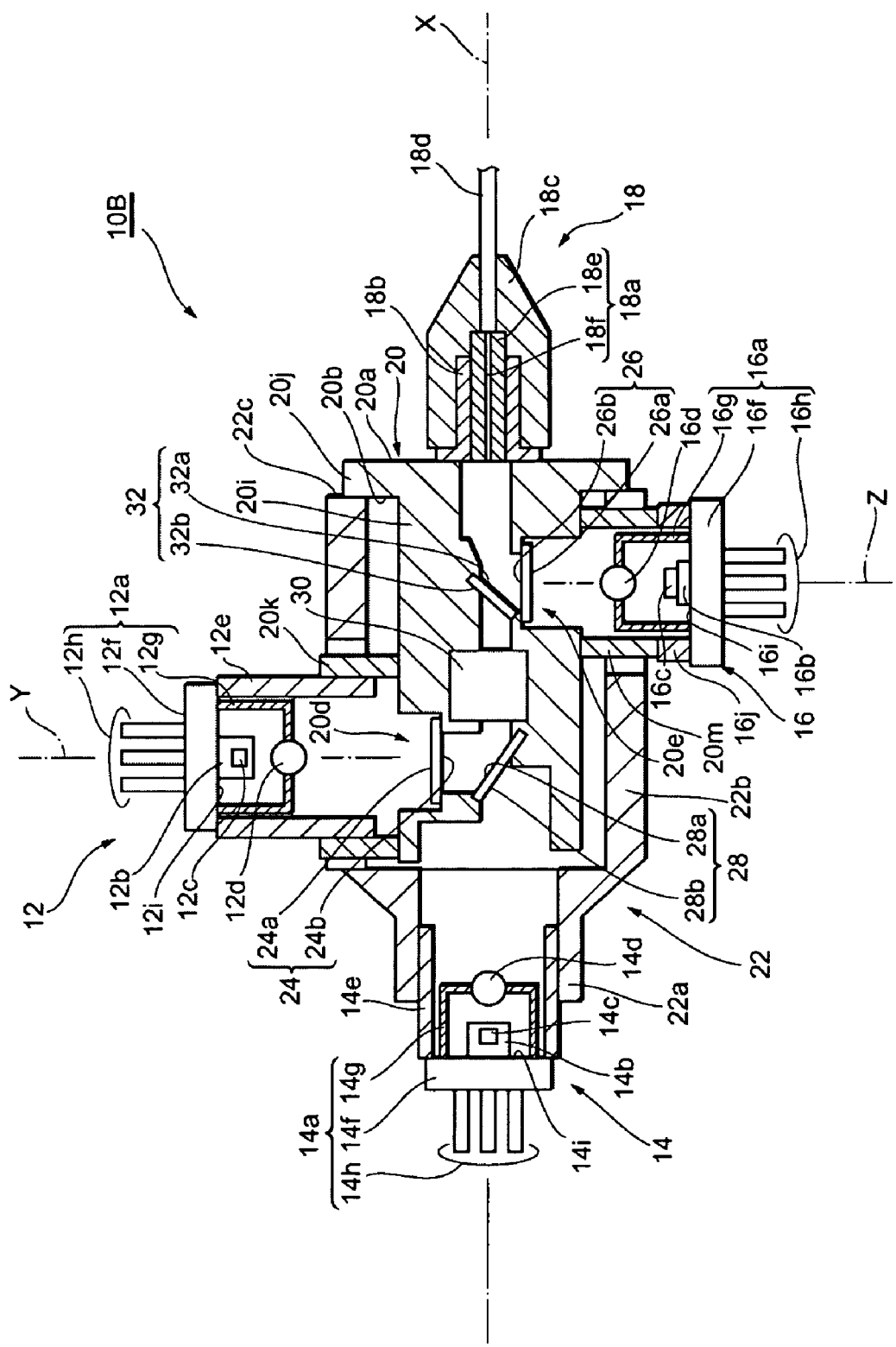
FIG. 3 is a cross sectional view of the bidirectional optical assembly according to the second embodiment of the invention.

FIG. 3 is a cross sectional view of the second embodiment of the bi-directional optical assembly according to the present invention. Next, regarding the bi-directional optical assembly 10b shown in FIG. 3, configurations different from those of the bi-directional optical assembly 10 already described will be described.

In the bi-directional optical assembly 10b, the ROSA 16 further provides the sleeve 16j. This sleeve 16h has a tubular shape with one end thereof being secured by the mounting surface 16i, while, the other end thereof facing the end of the second alignment member 20m. The inner diameter of the second alignment member 20m is slightly greater than the outer diameter of the lens cap 16g.

According to this bi-directional optical assembly, the ROSA 16 may adjust the position along two directions each intersecting the axis Z by sliding the end surface of the sleeve 16j on the end surface of the second alignment member 20m. Accordingly, the optical coupling between the ROSA 16 and the coupling fiber 18f may be further precisely carried out.

The present invention is not restricted to those embodiments mentioned above and may have various modifications. For example, the bi-directional optical assembly mentioned above has a configuration what is called as the pig-tailed type. However, the bi-directional optical assembly may be what is called as the receptacle type.

Figure 4:
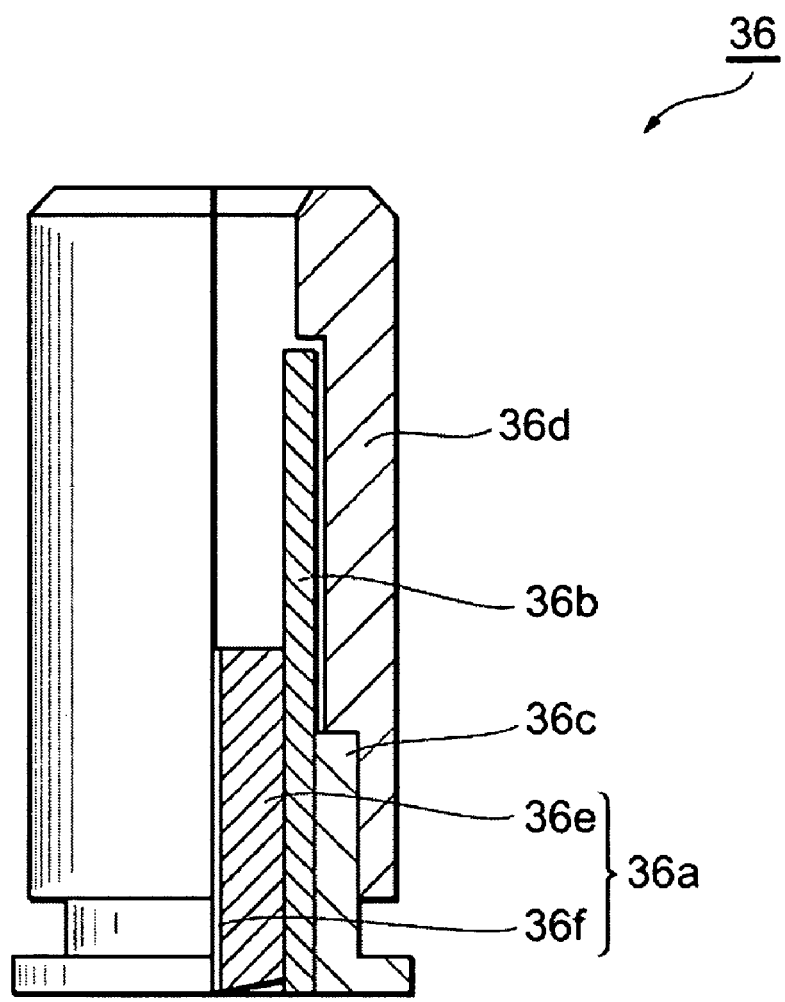
FIG. 4 shows the sleeve assembly according to a modified embodiment.

The bi-directional optical assembly with the receptacle type may provide a sleeve assembly 36 shown in FIG. 4 instead of the sleeve assembly 18. FIG. 4 shows the sleeve assembly 36 in partially broken. This sleeve assembly 36 comprises a stub 36a, a sleeve 36b, a bush 36c and a sleeve cover 36d.

The stub 36a includes a ferrule 36e and a coupling fiber 36f provided in a center of the ferrule 36e. The stub 36a is secured in a root portion of the sleeve 36b. The sleeve 36b secures the optical fiber inserted into a tip portion thereof. The sleeve 36b may be a split sleeve with a slit along the axis thereof. The root portion of the sleeve 36b is secured by the bush 36c. The bush 36c secures the stub 36a via the root portion of the sleeve 36b inserted into a bore thereof. The sleeve cover 36d is provides so as to cover the bush 36c and the sleeve 37b.

This sleeve assembly 36 is fixed to the inner housing 20 after aligning sleeve by sliding the end surface of the bush 36c on the first surface 20a of the inner housing 20. The one end of the coupling fiber 36 within the sleeve assembly 36 optically couples with the condenser lenses, 12d, 14d and 16d.

Figure 5:
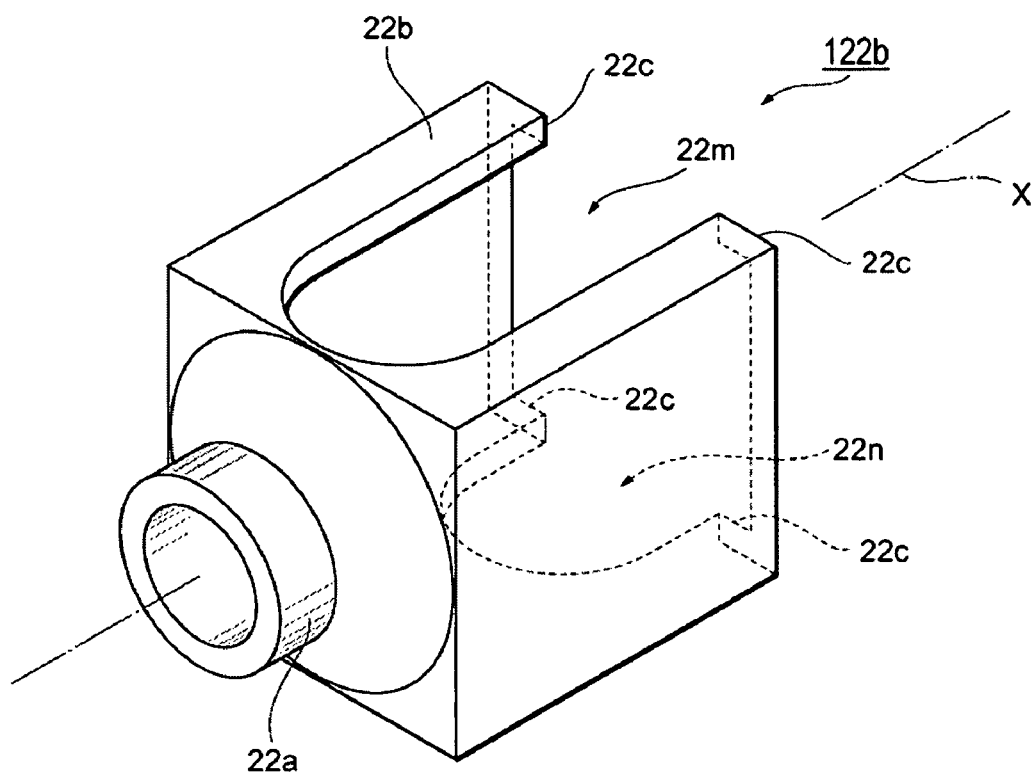
FIG. 5 shows the housing according to a modified embodiment.

Moreover, a modified housing 122b shown in FIG. 5 may be applied instead of the outer housing 122. FIG. 5 is a perspective view of the modified housing 122b. Next, structures of the modified housing 122b different from the outer housing 20 will be described. The modified housing 122b forms a first slit 22m instead of the opening 22d, and a second slit 22n instead of the opening 22e. These two slits, 22m and 22n, extend along the axis X to the end, a side to where the sleeve assembly 18 is to be fixed thereto, of the modified housing 122b.

When this modified housing 122b is practically applied, the cap portion 22b of the modified housing 122b receives the inner housing 20 after the body portion 20i installs the first and second alignment members, 20k and 20m.

What is claimed is:

1. A bi-directional optical assembly applied in a full duplex optical communication using a single optical fiber, comprising:

a first transmitting optical subassembly for emitting light with a first wavelength to the single optical fiber;

a second transmitting optical subassembly for emitting light with a second wavelength different from the first wavelength to the single optical fiber;

a receiving optical subassembly for receiving light with a third wavelength different from the first and second wavelengths from the single optical fiber;

a first wavelength division multiplex filter arranged between the first and second transmitting optical subassemblies, the first wavelength division multiplex filter reflecting the light with the first wavelength and transmitting the light with the second wavelength;

a second wavelength division multiplex filter arranged between the single optical fiber and the receiving optical subassembly, the second wavelength division multiplex filter transmitting the light with the first and second wavelengths and reflecting the light with the third wavelength;

an isolator provided between the first and second wavelength division multiplex filters, the isolator transmitting light propagating from the first wavelength division multiplex filter to the second wavelength division multiplex filter and cutting light propagating from the second wavelength division multiplex filter to the first wavelength division multiplex filter;

a sleeve assembly configured to secure the single optical fiber; and a housing configured to install the first and second wavelength division multiplex filters and the isolator, and to secure the first transmitting optical subassembly, the receiving optical subassembly and the sleeve assembly.

2. The bi-directional optical assembly according to claim 1, wherein the housing further installs a first wavelength selective filter between the first wavelength division multiplex filter and the first transmitting optical subassembly, the first wavelength selective filter transmitting the light with the first wavelength and cutting light with wavelengths other than the first wavelength.

3. The bi-directional optical assembly according to claim 1, wherein the housing further installs a second wavelength selective filter between the second wavelength division multiplex filter and the receiving optical subassembly, the second wavelength selective filter transmitting light with the third wavelength and cutting light with wavelengths other than the third wavelength.

4. The bi-directional optical assembly according to claim 1, wherein the housing includes an inner housing and an outer housing, the first transmitting optical subassembly and the receiving optical subassembly optically coupling with the single optical fiber through the inner housing, the second transmitting optical subassembly optically coupling with the single optical fiber through the outer housing, 5. The bi-directional optical assembly according to claim 4, wherein the sleeve assembly is fixed to an end surface of the inner housing, wherein the first transmitting optical subassembly is fixed to a surface of the inner housing substantially perpendicular to the end surface of the inner housing, and wherein the first wavelength division multiplex filter bends an optical axis connecting the first transmitting optical subassembly to the single fiber by substantially a right angle.

6. The bi-directional optical assembly according to claim 5, wherein the first transmitting optical subassembly is secured by the inner housing via a first alignment member.

7. The bi-directional optical assembly according to claim 4, wherein the inner housing provides a flange in an end portion thereof, the flange providing an outer surface and inner surface, the outer surface of the flange fixing the sleeve assembly thereto and the inner surface of the flange fixing an end surface of the outer housing thereto, wherein the second transmitting optical subassembly is secured to an end surface of the outer housing opposite to the end surface fixed to the inner surface of the flange, and wherein the second transmitting optical subassembly has an optical axis connected to the single fiber, the optical axis being substantially a straight line.

8. The bi-directional optical assembly according to claim 4, wherein the sleeve assembly is secured to an end surface of the inner housing, wherein the receiving optical subassembly is secured to a surface of the inner housing substantially perpendicular to the end surface of the inner housing, and wherein the receiving optical subassembly has an optical axis connected to the single optical fiber which is bent by substantially a right angle by the second wavelength division multiplex filter.

9. The bi-directional optical assembly according to claim 8, wherein the receiving optical subassembly is secured to the inner housing through a second alignment member.

10. The bi-directional optical assembly according to claim 4, wherein the sleeve assembly includes, a stub securing a coupling fiber in a center thereof, a bush for securing the stub, and a sleeve cover for covering the stub and the bush, wherein the bush has an end surface fixed to an end surface of the inner housing.

11. The bi-directional optical assembly according to claim 10, wherein the sleeve assembly further includes a sleeve provided between the stub and the bush, the sleeve securing the stub, wherein the bush secures the stub through the sleeve, and wherein the sleeve cover covers the bush and the sleeve.

12. A method for manufacturing a bi-directional optical assembly that comprises a first transmitting optical subassembly for emitting light with a first wavelength, a second transmitting optical subassembly for emitting light with a second wavelength, a first wavelength division multiplex filter for reflecting the light with the first wavelength and for transmitting the light with the second wavelength, a receiving optical subassembly for receiving light with a third wavelength, a second wavelength division multiplex filter for transmitting the light with the first and second wavelengths and for reflecting light with a third wavelength, a sleeve assembly including an optical fiber for propagating light with the first to third wavelengths, and a housing including inner and outer housings, the inner housing being configured to install the first and second wavelength division multiplex filters and to secure the first transmitting optical subassemblies, the receiving optical subassembly and the sleeve assembly, the inner housing including a flange in an end surface thereof, the outer housing configured to receive the inner housing and including a support portion in a side where the flange is provided in the inner housing, the method comprising steps of:

(a) optically coupling the first transmitting optical subassembly with the optical fiber by sliding the sleeve assembly on the flange of the inner housing and by sliding the first transmitting optical subassembly, via a first alignment member, on a surface substantially perpendicular to the end surface of the inner housing; and (b) optically coupling the second transmitting optical subassembly with the optical fiber by sliding the second transmitting optical subassembly on the surface opposite to the side where the flange is provided in the inner housing and by sliding the outer housing on the flange.

13. The method according to claim 12, further comprising, after the step (a) and before step (b), a step of optically coupling the receiving optical subassembly with the optical fiber by sliding the receiving optical subassembly, via a second alignment member, on a surface substantially perpendicular to the end surface of the inner housing different from the surface where the first transmitting optical subassembly is slid.

14. The method according to claim 13, further comprising a step for sliding the receiving optical subassembly on the second alignment member.

15. The method according to claim 12, further comprising, after the step (a) and before step (b), a step for fixing the first transmitting optical subassembly to the inner housing by the YAG laser welding and for fixing the sleeve assembly to the end surface of the inner housing by the YAG laser welding; and a step, after the step (b), for fixing the second transmitting optical subassembly to the outer housing by the YAG laser welding and for fixing the end surface of the outer housing to the flange of the inner housing.

16. A bi-directional optical assembly applied in a full duplex optical communication using a single optical fiber, comprising:

a first transmitting optical subassembly for emitting light with a first wavelength to the single optical fiber;

a second transmitting optical subassembly for emitting light with a second wavelength different from the first wavelength to the single optical fiber;

a receiving optical subassembly for receiving light with a third wavelength different from the first and second wavelengths from the single optical fiber;

a first wavelength division multiplex filter arranged between the first and second transmitting optical subassemblies, the first wavelength division multiplex filter reflecting the light with the first wavelength and transmitting the light with the second wavelength;

a second wavelength division multiplex filter arranged between the single optical fiber and the receiving optical subassembly, the second wavelength division multiplex filter transmitting the light with the first and second wavelengths and reflecting the light with the third wavelength;

a sleeve assembly configured to secure the single optical fiber; and a housing comprising an inner housing and an outer housing, the inner housing installing the first and second wavelength division multiplex filters and securing the first transmitting optical subassembly, the receiving optical subassembly, and the sleeve assembly, the outer housing being secured to the inner housing and securing the second transmitting optical subassembly.

17. The bi-directional optical module according to claim 16, wherein the first transmitting subassembly and the receiving optical subassembly are optically coupled with the single optical fiber through the inner housing, and wherein the second transmitting subassembly is optically coupled with the single optical fiber through the outer housing.

* * * * *